(12) United States Patent
Tangirala et al.

(10) Patent No.: US 7,950,219 B2
(45) Date of Patent: May 31, 2011

(54) DUAL MODE COMBUSTION OPERATION OF A PULSE DETONATION COMBUSTOR IN A HYBRID ENGINE

(75) Inventors: Venkat Eswarlu Tangirala, Niskayuna, NY (US); Adam Rasheed, Glenville, NY (US); Anthony John Dean, Scotia, NY (US)

(73) Assignee: General Electric Company, Niskayuna, NY (US)

(*) Notice: Subject to any disclaimer, the term of this patent is extended or adjusted under 35 U.S.C. 154(b) by 1247 days.

(21) Appl. No.: 11/554,929

(22) Filed: Oct. 31, 2006

(65) Prior Publication Data

US 2008/0098748 A1 May 1, 2008

(51) Int. Cl.
F02K 5/02 (2006.01)

(52) U.S. Cl. .............. 60/247; 60/248; 60/249

(58) Field of Classification Search .......... 60/779, 60/39.091, 39.094, 247, 248, 249, 39.39, 60/39.38, 39.4, 39.76, 39.78, 39.8; 220/745–750
See application file for complete search history.

(56) References Cited

U.S. PATENT DOCUMENTS

| | | | | |
|---|---|---|---|---|
| 5,349,811 A | * | 9/1994 | Stickler et al. | 60/776 |
| 5,694,768 A | * | 12/1997 | Johnson et al. | 60/226.3 |
| 6,883,302 B2 | * | 4/2005 | Koshoffer | 60/204 |
| 6,983,586 B2 | * | 1/2006 | Tangirala et al. | 60/39.77 |
| 2003/0131584 A1 | * | 7/2003 | Butler et al. | 60/226.1 |
| 2007/0137172 A1 | * | 6/2007 | Rasheed et al. | 60/39.76 |

OTHER PUBLICATIONS

W.M. Beltman et al.; Linear Elastic Response of Tubes to Internal Detonation Loading; California Institute of Technology; Pasadena, CA.

W.M. Beltman et al.; The Structural Response of Cylindrical Shells to Internal Shock Loading; California Institute of Technology; Pasadena, CA.

Tong Wa Chao et al.; Comparison of Fracture Response of Preflawed Tubes Under Internal Static and Detonation Loading; California Institute of Technology; Pasadena, CA.

Janssen et al.; Mechanical Response of a Thin-Walled Pulsed Detonation Tube Under Cyclic Operation; Jul. 2006; pp. 1-12; 42nd AIAA/ASME/SAE/ASEE; Sacramento CA.

* cited by examiner

*Primary Examiner* — Michael Cuff
*Assistant Examiner* — Vikansha S Dwivedi
(74) *Attorney, Agent, or Firm* — Richard A. DeCristofaro

(57) ABSTRACT

A dual mode combustor of a gas turbine engine contains at least one dual mode combustor device having a combustion chamber, a fuel air mixing element, a high frequency solenoid valve and a fuel injector. During a first mode of operation the dual mode combustor device operates in a steady, constant pressure deflagration mode, receiving its fuel from the fuel injector. In a second mode of operation the dual mode combustor device operates in a pulse detonation mode, receiving its fuel from the high frequency solenoid valve.

22 Claims, 4 Drawing Sheets

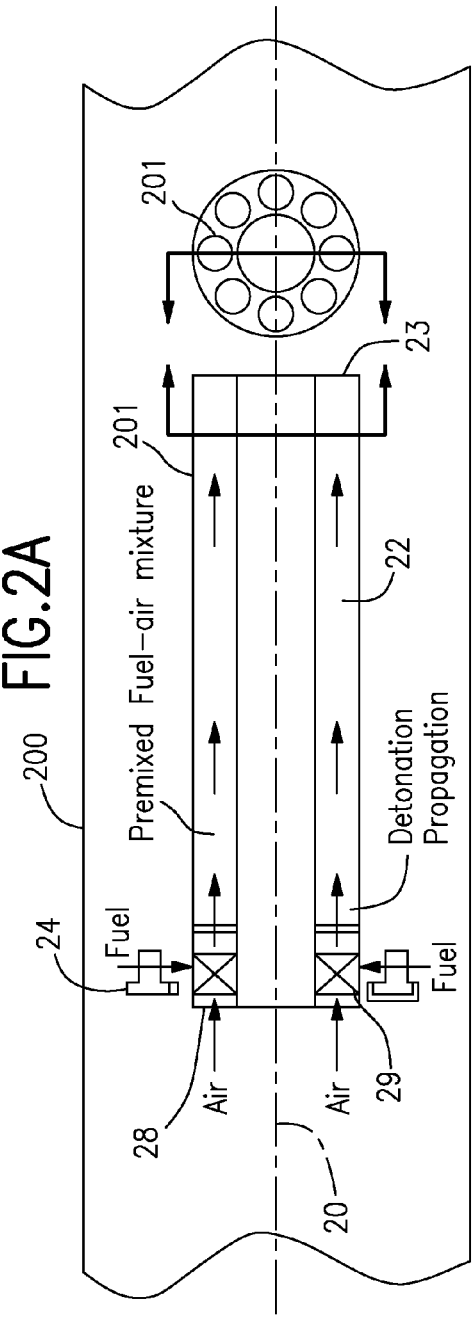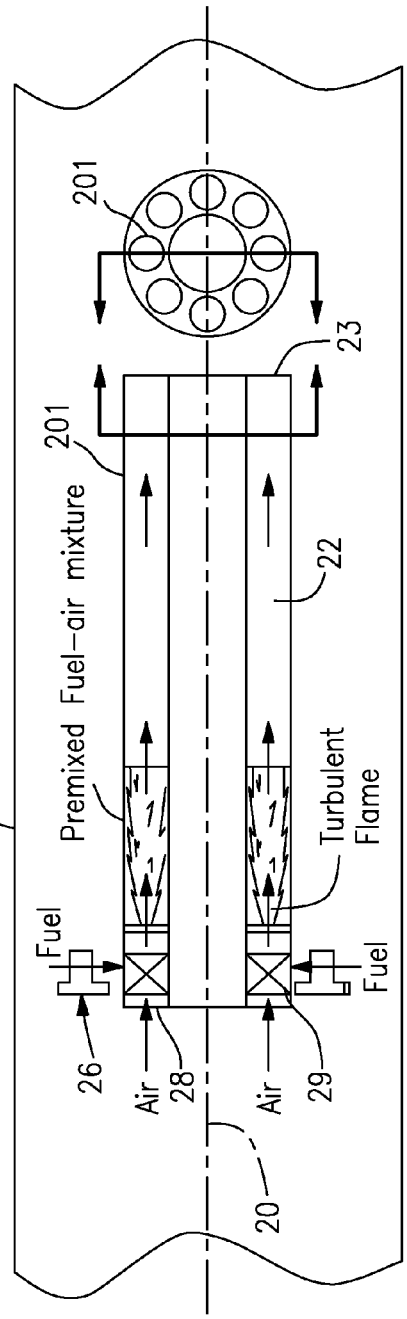

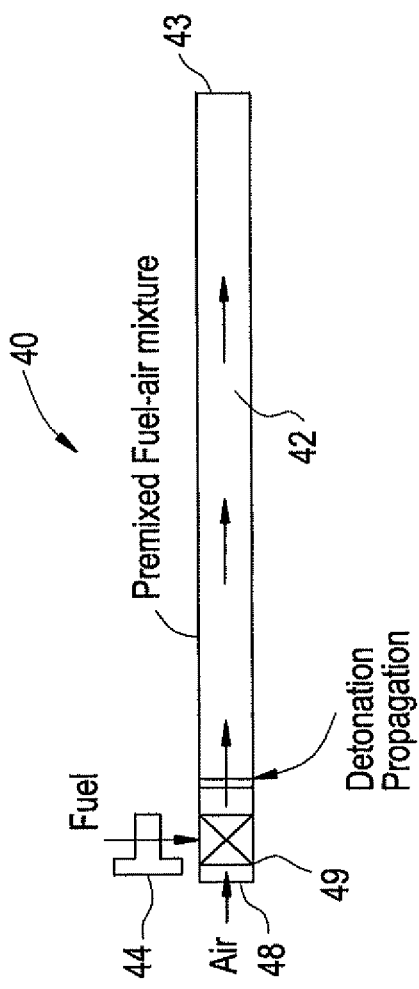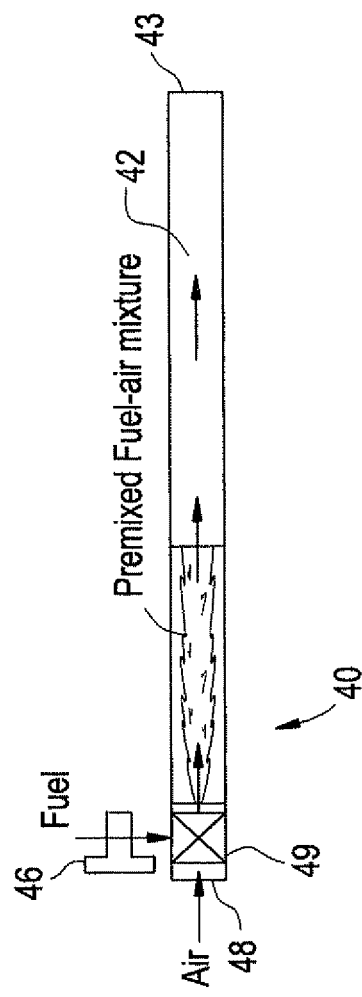

DUAL MODE COMBUSTION OPERATION OF A PULSE DETONATION COMBUSTOR IN A HYBRID ENGINE

BACKGROUND OF THE INVENTION

This invention relates to pulse detonation systems, and more particularly, to dual mode pulse detonation systems which are capable of operating in both detonation and deflagration modes.

With the recent development of pulse detonation combustors (PDCs) and engines (PDEs), various efforts have been underway to use PDCs in practical applications, such as combustors for aircraft engines. In typical aircraft engines, the combustor stage is a steady, constant pressure combustor which provides a steady, constant pressure, such as that provided by deflagration.

During normal operation, a conventional gas turbine engine experiences a wide variety of engine inlet conditions to the combustor. When used on aircraft these inlet conditions are experienced throughout the different phases of flight. For example, the combustor will experience different inlet conditions during takeoff, top of climb, cruise and landing. Because of the wide variety of inlet conditions experienced during flight, it is difficult to operate a pulse detonation combustor throughout all flight conditions, which are functions of Mach number and altitude.

One solution to this is to have the pulse detonation combustor only operate during a restricted portion of the flight envelope, and be inert during the remaining portions. However, this results in added complexity, cost and weight to an aircraft engine for a benefit which can be obtained only during limited portions of the flight envelope.

SUMMARY OF THE INVENTION

In an embodiment of the invention, a gas turbine engine contains a dual-mode combustor which can be operated in a steady, constant pressure combustion, or deflagration, mode and a pulse detonation mode. This allows the dual mode combustor to operate efficiently in all flight conditions. Specifically, in the present invention the dual mode combustor will operate in a steady, constant pressure deflagration mode during certain portions of the flight envelope and as a pulse detonation combustor in other portions of the flight envelope. This ensures that the dual mode combustor is able to operate in all possible flight conditions, providing a highly efficient combustion stage.

The present invention contemplates at least three different embodiments, each of which is set forth briefly below. It is further recognized, however, that the present invention is not limited to these exemplary embodiments.

In a first exemplary embodiment of the invention, the dual mode combustor is in a single annular configuration surrounding the central axis of the engine, where during some portions of the flight envelope the annulus operates in a steady, constant pressure deflagration mode, whereas in other portions of the flight envelope the annulus operates in a pulse detonation mode.

In a second exemplary embodiment of the invention, a plurality of segregated and separate dual mode combustor cans are distributed annularly around an axis of the engine. During certain aspects of the engine operation the cans are operated in a steady, constant pressure deflagration mode, whereas in other aspects of engine operation the combustors are operated in pulse detonation mode.

In an alternative exemplary embodiment, a similar structure is used as in the above second exemplary embodiment except that during certain engine operation parameters a number of the combustors are operated in pulse detonation mode while the others are operation in a steady, constant pressure deflagration mode. This produces a mixture of steady constant pressure deflagration and unsteady pulse detonation from the dual mode combustor, thus optimizing performance in those flight conditions where such a combustor output is optimal. However, this embodiment also allows all of the combustors to operate in steady, constant pressure deflagration mode or pulse detonation mode as the flight conditions require.

As used herein, a "pulse detonation combustor" PDC (also including PDEs) is understood to mean any device or system that produces both a pressure rise and velocity increase from a series of repeating detonations or quasidetonations within the device. A "quasi-detonation" is a supersonic turbulent combustion process that produces a pressure rise and velocity increase higher than the pressure rise and velocity increase produced by a deflagration wave. Embodiments of PDCs (and PDEs) include a means of igniting a fuel/oxidizer mixture, for example a fuel/air mixture, and a detonation chamber, in which pressure wave fronts initiated by the ignition process coalesce to produce a detonation wave. Each detonation or quasidetonation is initiated either by external ignition, such as spark discharge or laser pulse, or by gas dynamic processes, such as shock focusing, auto ignition or by another detonation (i.e. cross-fire).

BRIEF DESCRIPTION OF THE DRAWINGS

The advantages, nature and various additional features of the invention will appear more fully upon consideration of the illustrative embodiment of the invention which is schematically set forth in the figures, in which:

FIGS. 2A and 2B show a diagrammatical representation of a cross-sectional side view of a gas turbine engine incorporating a second exemplary embodiment of the present invention;

FIGS. 4A and 4B show a diagrammatical representation of a single tube embodiment of the present invention.

DETAILED DESCRIPTION OF THE INVENTION

The present invention will be explained in further detail by making reference to the accompanying drawings, which do not limit the scope of the invention in any way.

Figure 1A:
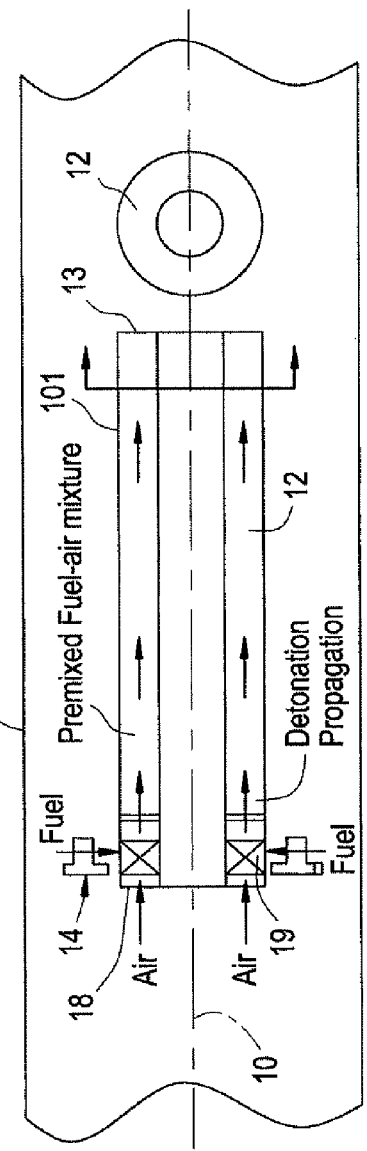
FIGS. 1A and 1B show a diagrammatical representation of a cross-sectional side view of a gas turbine engine incorporating a first exemplary embodiment of the present invention.
Figure 1B:
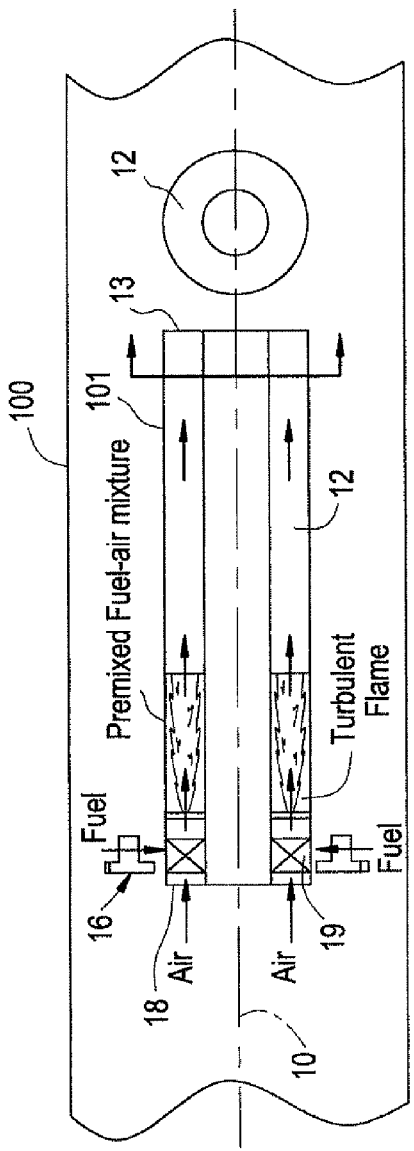

FIGS. 1A and 1B show a diagrammatical representation of a cross-sectional side view of a gas turbine engine 100 incorporating a first exemplary embodiment of the present invention (along with the end view). As depicted, in this embodiment the engine 100 contains a dual mode combustor section 101, having a combustion chamber 12 formed in an annulus shape. As shown, the combustion chamber 12 has a cross-sectional shape in an annulus form, which extends along a length of the dual mode combustor 101, and is centered about an engine axis. Although an annulus cross-section is depicted in these figures, it is noted that the present invention is not limited to this cross-sectional shape and additional crosssections are contemplated. For example, it is contemplated that a hexagonal cross-section may be used, as well as a cylindrical cross-section.

In the present invention, the dual mode combustor 101 comprises an exit portion 13, which is adjacent to a turbine inlet portion (not shown) so as to direct exhaust gases from the dual mode combustor 101 into an engine turbine section. The configuration of the exit portion 13 is to be such as to optimize the transition of the exhaust gases from the dual mode combustor 101 to the turbine section (not shown).

The dual mode combustor 101 also contains an inlet portion 18, which allows air flow from a compressor stage (not shown) to enter the inlet portion 18. The inlet portion 18 is configured to maximize efficiency of air flow from the compressor stage (not shown) into the inlet portion 18 of the dual mode combustor 101. As the air flow passes through the inlet portion 18 it enters a fuel-air mixing element 19 which mixes the air flow with fuel. In the present invention, a plurality of fuel-mixing elements 19 are distributed radially around the engine axis so as to allow the fuel-air mixture to enter the combustion chamber 12 of the combustor 101. It is also contemplated that in an alternative embodiment the fuel-air mixing element 19 is a single continuous element which is configured to match the shape of the chamber 12 so as to provide a continuous mixing element. Thus, in the embodiment shown in FIGS. 1A and 1B the mixing element 19 would be an annulus shape.

It is noted that the present invention is not limited in any way to the shape, geometry or configuration of the fuel-air mixing element 19. The element, or elements 19 are to be configured to optimize fuel-air mixing for both constant pressure deflagration operation and detonation operation of the combustor 101. It is also noted that the inlet portion 18 is not limited to being adjacent to a compressor stage portion of an engine, but can be merely downstream of an inlet portion of the engine 100. Thus, any upstream configuration of the engine 100 is contemplated.

Surrounding the combustor 101 adjacent to the fuel-air mixing element(s) 19 are a plurality of first fuel input portions, also referred to herein as fuel injectors, 16 and a plurality of second fuel input portions, also referred to herein as high frequency solenoid valves, 14. Each of the valves 14 and injectors 16 are distributed radially around the perimeter of the combustor 101 so as to provide even fuel distribution. In an embodiment with discrete fuel-air mixing elements 19, each element 19 is paired with either one of the valves 14 or injectors 16.

In one embodiment, the valves 14 and injectors 16 are distributed in an alternating configuration. This ensures an even and symmetrical distribution of valves 14 and injectors 16. In a further exemplary embodiment, each of the elements 19 are coupled to at least one each of a valve 14 and injector 16. Thus both the valve 14 and injector 16 either share a fuel inlet port into the mixing element 19, or use separate inlet ports into the same mixing element 19. In such a configuration both the valve 14 and injector 16 may be coupled in a single fuel supply device, to save space.

In a further embodiment, a fuel supply device is used (not shown) which is capable of operating as both a high frequency solenoid valve during one mode of operation and as an injector in a second mode of operation. Therefore, in the pulse detonation mode of operation it is possible for the fuel supply to pulsed or non-pulsed, depending on the operational needs.

Air flow into the combustor 101 may be controlled by any known means, including but not limited to mechanical valves. In an alternative embodiment air flow can be constant. Thus, like the fuel, the air flow may be pulsed or non-pulsed, depending on the desired operational parameters and performance. Further, the flow control may be provided through a valveless control method, rotary valves, conventional mechanical valves, etc.

Therefore, in various embodiments of the present invention, each of the fuel flow and the air flow may be pulsed or non-pulsed, or one may be pulsed while the other is non-pulsed, to achieve the desired performance and satisfy whatever operational parameters are desired.

The operation of the present invention, as depicted in FIGS. 1A and 1B will now be described.

During a first operation condition the combustor 101 is operated in a steady, constant pressure deflagration condition, where the injectors 16 are injecting fuel through the mixing elements 19 such that a steady, constant pressure combustion is maintained. This operation is similar to that of existing combustor technology as the fuel is mixed with the air and is ignited in a steady, constant pressure deflagration state. This condition is maintained for any number of operation/flight conditions where steady, constant pressure deflagration provides optimal output from the exit 13 into the turbine stage (not shown). For the purposes of the present invention, any known and conventional means of ignition for the fuel-air mixture may be used to ignite the fuel air mixture, and the present invention is not limited in this regard.

Additionally, the operation is to be such that flame stabilization inside the combustor is maintained. For the purposes of the present invention, any conventional method and means of stabilization may be used, such as aerodynamic stabilization, bluff body stabilization and obstacle stabilization.

Then, as operational/flight conditions change to a second operational condition, the operation of the combustor 101 is changed from steady, constant pressure deflagration to pulse detonation combustion. This change may be controlled automatically with a combustion control system (not shown) and/or may be controlled manually as flight and operational parameters require. During this stage of operation, the valves 14 are employed to inject fuel through their corresponding mixing elements 19 pursuant to the conditions required for obtaining pulse detonations. It is noted that the operation and control of pulse detonation engines/combustors are known such that a detailed discussion of their operation is not necessary for understanding the scope of the present invention.

In an embodiment of the invention, the control system (not shown) used to control the operation of the engine 100 and/or the transition process monitors the certain aspects of the engine 100 performance and/or parameters to determine whether or not a transition is to be made. For example, an embodiment of the invention monitors inlet air pressure to the engine 100 and/or the inlet portion 18 of the combustor 101 to determine whether a transition needs to be made. For example, such a change would be triggered as the control system (not shown) logic determines that a specific mode of combustion (deflagration or detonation) is not feasible at a given altitude conditions, and there is a need to transition to the other type of mode (detonation/deflagaration).

During this stage of operation, the valves 14 provide fuel, through their respective mixing elements 19, which is detonated at some point downstream within the combustion chamber 12 so as to provide a detonation, as opposed to a deflagration. In an embodiment of the invention, the ignition source for the detonation may be the same as that used for the steady, constant pressure deflagration, or may be an alternative ignition source. In any event, any commonly known and used ignition source for detonation may be used.

In an embodiment where the valves 14 and injectors 16 share a mixing element 19, the injectors 16 may have a mechanical valve portion to prevent any upstream pressure, from a detonation, from entering the injectors 16. Further, in an alternative embodiment, where each of the injectors 16 and valves 14 are coupled to their own respective mixing element 19, again the injectors 16 may contain mechanical flow control valves which will prevent pressure from the detonations from traveling upstream through the injectors during the pulse detonation operation of the combustor 101.

During the pulse detonation operation, the valves 14 are controlled to provide the necessary fuel pulse required for the desired detonation frequency. The valves 14 can be of any known design or configuration so long as the desired operational characteristics are provided. In an embodiment of the present invention, the frequency of fuel pulsing and detonation can be adjusted in accordance with the operational parameters and desired performance parameters.

Again, as the flight conditions change again, the combustor is transitioned back to steady, constant pressure deflagration from the pulse detonation operation, so that the valves 14 are no longer providing the fuel, but the injectors 16 are supplying the fuel.

In an embodiment of the present invention, it is contemplated that during the transition phase the operation of the valves 14 and injectors 16 overlap such that there is no abrupt transition from one operational condition to the other.

To ensure sufficient inlet air flow during both phases of operation, in an embodiment of the present invention the air flow from the compressor section (not shown) is controlled such that the required amount of air flow and pressure is maintained for either the deflagration or detonation operation. In one embodiment, the exit structure of the compressor stage is made so as to provide the necessary flow control, whereas in an alternative embodiment the inlet portion 18 of the combustion stage is configured so as to provide the necessary flow control.

FIGS. 2A and 2B show another embodiment of the present invention, where the overall operation of the engine 200 is similar to that of the engine 100 discussed above. However, in this embodiment, rather than having a single annulus type combustor 101 (FIG. 1), the combustor stage has a plurality of individual dual mode combustors 201 which are distributed radially around a center line 20 of the engine 200. As shown in FIGS. 2A and 2B there are eight combustors 201 distributed radially in an annulus type pattern around the centerline of the engine 200. However, the present invention is not limited to either the number of the combustors or their respective position. The present invention contemplates any number of individual combustors 201 distributed in any pattern so as to provide sufficient output from the exit portion 23 of the combustion stage into the turbine stage (not shown). In most embodiments of the present invention the individual combustors 201 are distributed symmetrically with respect to the centerline 20 and in some embodiments a combustor 201 is centered on the centerline of the engine 200.

In this aspect of the invention, each of the combustors 201 receive input air through an input portion 28 from a compressor stage (not shown). Further, each of the combustors 201 contains at least one fuel-air mixing element 29 which mixes the input air with fuel. The fuel is received from at least one fuel injector 26, when operating in steady, constant pressure deflagration mode, and a high frequency solenoid valve 24, when operating in pulse detonation mode.

Thus, each of the combustors 201 are coupled to at least one valve 24 and at least one injector 26, both of which feed fuel into the mixing element 29 during operation. As with the embodiment in FIGS. 1A and 1B, the valve 24 and injector 26 may feed the fuel through the same inlet port to the element 29, or in an alternative embodiment the fuel is fed into the mixing element 29 through separate ports, where one port coupled to the valve 24 and another is coupled to the injector 26.

In either embodiment, the mixing element 29 mixes the fuel and air flow from the inlet portion 28 so as to provide a sufficient fuel air mixture for either mode of operation. Further, each of the combustors 201 contain a combustion chamber 22, within which either the deflagration or the detonation takes place.

During operation the combustors 201 are operated similarly to that described above with regard to FIGS. 1A and 1B, in that during certain operation/flight conditions the combustors 201 are operated in a steady, constant pressure deflagration mode, while in other operation/flight conditions the combustors 201 are operated in pulse detonation mode.

In one embodiment of the invention, when the combustors 201 are operated in pulse detonation mode, they are operated on alternating cycles. For example, during pulse detonation operation four of the eight combustors 201 are in the detonation stage, while the remaining four are in the purge stage. The distribution and frequency of operation are to be optimized to ensure maximum turbine performance and operation. In another embodiment, the combustors 201 are operated with different frequencies so as to avoid the creation of any resonant frequencies within the structure of the engine 200.

In one embodiment of the present invention, all of the combustors 201 are transitioned from one mode of operation to the other at the same time. This operation is similar to that in FIGS. 1A and 1B where the overall transition of the combustor stage of the engine from one mode to the other takes place at one time. However, in an alternative embodiment, the transition of some of the combustors 201 is done before the remaining combustors 201. In this embodiment, the transition from detonation to deflagration, and vice versa, may be made smoother, by transitioning only some of the combustors while the remaining remain in the original mode of operation longer, and then begin transition at or near the time when the initial transitioning combustors 201 complete their transition. For example, when transitioning from detonation to deflagration mode, half of the combustors 201 begin transition before the others, and then when the initial combustors 201 reach steady, constant pressure deflagration, the remaining half of the combustors 201 begin transition. Of course, the present invention also contemplates additional transition timing methods, and is not limited to the above example. For example, it is also contemplated that a third of the combustors 201 begin transition and when they reach the transition midpoint another third begin transition, and when the first group complete transition, the remaining third begin transition.

An additional embodiment of the present invention is similar to that shown in FIGS. 2A and 2B, except that the operation of the individual combustors are such that during certain operational/flight conditions some of the combustors 201 are operated at a steady, constant pressure deflagration state while the others are operated in a pulse detonation state. For example, in an embodiment of the invention, during a first type of operational conditions all of the combustors 201 are operated in a steady, constant pressure deflagration state, in a second type of operational conditions all of the combustors 201 are operated in a pulse detonation state, and in a third type of operational conditions some of the combustors 201 are operated in a steady, constant pressure deflagration mode while the other are operated in a pulse detonation mode. The number of combustors 201 being operated in one mode versus the other mode can be adjusted based on the desired operational and performance parameters.

In one embodiment of this invention, it is contemplated that half of the combustors 201 are operated in each respective mode, such that combustors 201 which are adjacent to each other, are operating in alternative modes. Stated differently, during this type of operation a combustor 201 operating in the steady, constant pressure deflagration mode would be adjacent to combustors 201 operating in pulse detonation mode. This method of distribution provides symmetrical operation of the engine as whole. Of course, the present invention is not limited to this method of operation, as it is also contemplated that in an alternative embodiment the number of combustors 201 operating in any one given mode can be changed or altered to optimize engine operation for a given type of operational/flight characteristics. For example, it is contemplated that in the embodiment shown in FIGS. 2A and 2B only two of the combustors 201 are operated in the pulse detonation mode while the remaining six are operated in steady, constant pressure deflagration mode.

It is further contemplated that the number of combustors 201 operating in any one given mode may be adjusted based on the operational/flight characteristics and performance parameters desired.

It is further contemplated that during operation of this embodiment, the combustors 201 operating in pulse detonation mode alternate, such that after a certain duration of operation in pulse detonation mode the combustor(s) transition to deflagration mode, while those operating in deflagration mode would then transition to operation in detonation mode. This aids in increasing the operational life of the combustors 201.

It is further contemplated that the central region of the combustor stage adjacent to the engine centerline 10/20 can have at least some of the air from the compressor stage pass through it to aid in cooling the combustors 101/201. In an additional embodiment of the present invention, an external thermal management system (not shown) is provided. It is known that both pulse detonation and steady, constant pressure deflagration operations can generate large amounts of heat. Therefore, an embodiment of the present invention includes a thermal management system of some kind, whether using air flow or liquid. In another embodiment of the invention, during pulse detonation operation, cooling of the chamber 22 can be done via "purging" cooling. This is when during the purge stage of the pulse detonation process the air flow used to purge the chamber 22 (from the previous detonation) is used to also cool the chamber area. Because this operation is known, it will not be discussed in detail herein.

In a further embodiment, the engine centerline 10/20 portion can contain a constant pressure deflagration engine of known construction. Alternatively, a pure PDC can be placed along the centerline 10/20. In further exemplary embodiments, either a constant pressure deflagration engine or at least one PDC is positioned radially external to the combustors 101/201.

Figure 3:
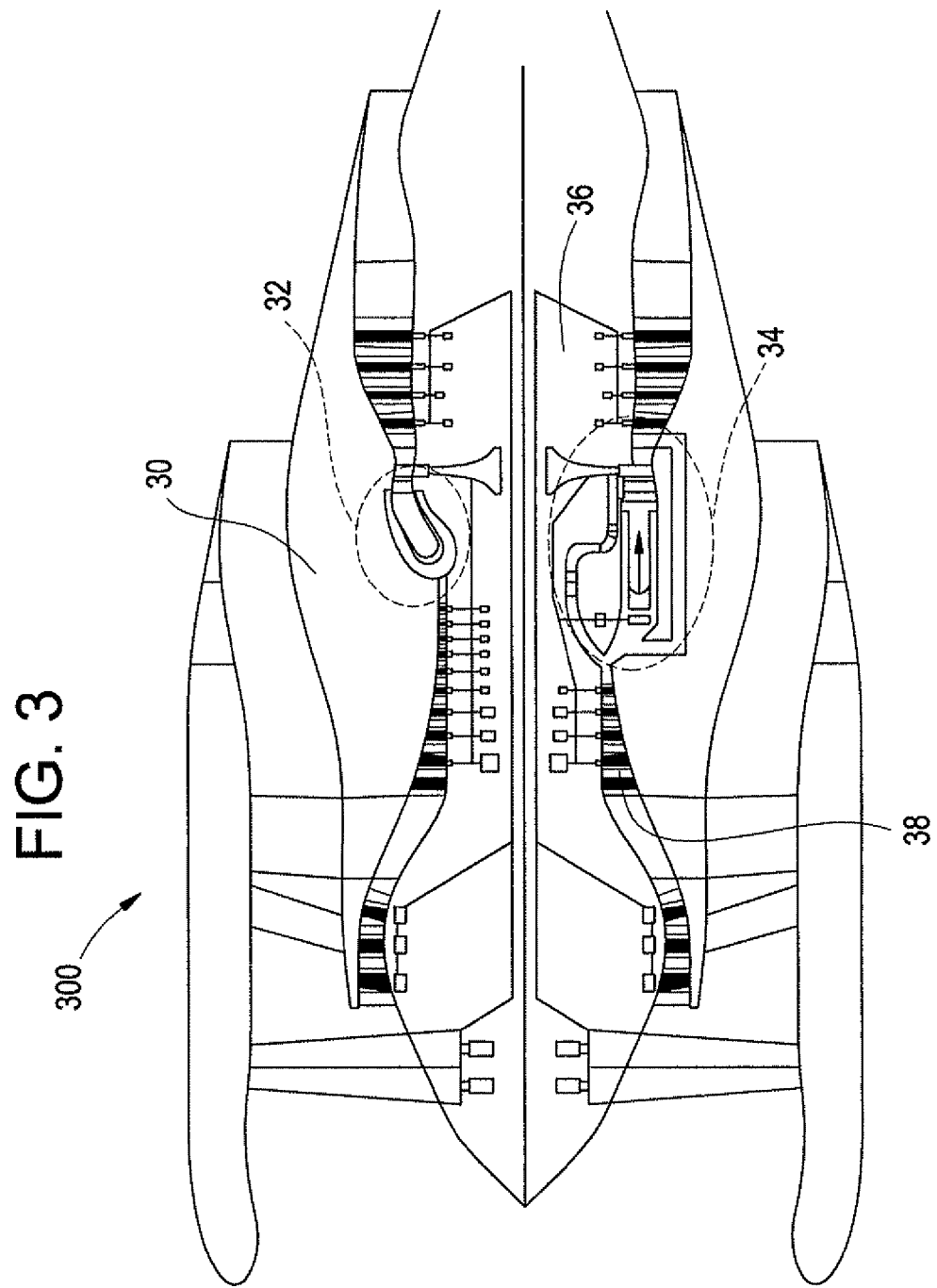
FIG. 3 shows a diagrammatical representation of a gas turbine aircraft engine having a combustion stage incorporating an embodiment of the present invention.

FIG. 3 shows a representation of an aircraft engine 300 which has a combustor stage 30 having a typical steady, constant pressure combustor portion 32 and a dual mode combustor portion 34, in accordance with an embodiment of the present invention. In this aspect of the invention, the engine 300 employs both the steady, constant pressure combustor portion 32 and the dual mode combustor portion 34. During a first type of flight/operational characteristics both the steady, constant pressure combustor portion 32 and the dual mode combustor portion 34 are operating in a steady, constant pressure deflagration mode. (This mode of operation has been described above with regard to FIGS. 1A through 2B). In a second type of flight/operational characteristics, the operation of the dual mode combustor portion 34 is operated in a pulse detonation mode. This combination then provides optimal system performance for the selected modes of flight/operation.

The flight/operational characteristics for which the dual mode combustor portion 34 should be operated as a pulse detonation combustor are determined to optimize performance of the turbine portion 36 taking into account flight/operational characteristics of the engine 300 and the compressor portion 38.

FIGS. 4A and 4B show a single tube version of a dual mode combustor 40 according to an embodiment of the present invention. The engine 300 can employ at least one of the combustors 40. In an embodiment of the invention, if more than one combustor 40 is used, the distribution should be symmetrical with regard to the centerline of the engine 300 so as to minimize any uneven stresses on the turbine portion 36.

The dual mode combustor 40 shown in FIGS. 4A and 413 is similar in structure to the combustors shown in FIGS. 2A and 2B. (FIG. 4A depicts the combustor 40 during pulse detonation operation, whereas FIG. 4B depicts the combustor 40 in steady, constant pressure deflagration operation). The combustor contains a combustion chamber 42 in which the fuel-air mixture is combusted (in either mode of operation) and an exit portion 43 through which the combustion exits. Further, during pulse detonation operation a high frequency solenoid valve 44 supplies fuel to the fuel-air mixing element 49 during pulse detonation operation, while a fuel injector 46 supplies fuel during steady, constant pressure deflagration operation. Air enters the combustor 40 through an air inlet portion 48.

It is noted that although the present invention has been discussed above specifically with respect to aircraft applications, the present invention is not limited to this and can be in any similar gas turbine configuration which experiences varying operational/performance conditions thus requiring dual mode operation of the combustor stage.

While the invention has been described in terms of various specific embodiments, those skilled in the art will recognize that the invention can be practiced with modification within the spirit and scope of the claims.

What is claimed is:

1. A dual mode combustor, comprising:
at least one fuel-air mixing element coupled to a combustion chamber; and
at least one fuel input device coupled to said fuel-air mixing element, wherein said fuel input device has a first fuel input portion and a second fuel input portion comprising a high frequency solenoid valve which pulses the fuel flow; and
wherein during a first mode of operation said dual mode combustor is operated in a deflagration mode and fuel is input into said fuel-air mixing element from said first fuel input portion of said fuel input device to support said deflagration mode, and during a second mode of operation said dual mode combustor is operated in a pulse detonation mode and fuel is input into said fuel-air mixing element from said second fuel input portion of said fuel input device to support said pulse detonation mode.

2. The dual mode combustor of claim 1, wherein said first fuel input portion is a fuel injector.

3. The dual mode combustor of claim 1, wherein said combustion chamber has either an annulus or circular cross-section.

4. A combustor, comprising:
a plurality dual-mode combustors, wherein each of said plurality of dual-mode combustors comprises:
at least one fuel-air mixing element coupled to a combustion chamber; and
at least one fuel input device coupled to said fuel-air mixing element, wherein said at least one fuel input device has a first fuel input portion and a second fuel input portion comprising a high frequency solenoid valve which pulses the fuel flow; and
wherein during a first mode of operation at least one of said dual mode combustors is operated in a deflagration mode and fuel is input into said fuel-air mixing element from said first fuel input portion of said fuel input device to support said deflagration mode, and during a second mode of operation said at least one of said dual mode combustors is operated in a pulse detonation mode and fuel is input into said fuel-air mixing element from said second fuel input portion of said fuel input device to support said pulse detonation mode.

5. The combustor of claim 4, wherein said first fuel input portion is a fuel injector.

6. The combustor of claim 4, wherein the combustion chamber of said at least one dual mode combustors has a circular cross-section.

7. The combustor of claim 4, wherein the during said first mode of operation all of said dual mode combustors are operated in said deflagration mode, and during said second mode of operation all of said dual mode combustors are operated in said pulse detonation mode.

8. The combustor of claim 4, wherein said plurality of dual-mode combustors are coupled to a plurality of fuel input devices, wherein each of said plurality of fuel input devices is coupled to only one of said plurality of dual-mode combustors.

9. The combustor of claim 4, wherein during a third mode of operation at least some of said dual mode combustor are operated in said deflagration mode and the remaining of said duel mode combustors are operated in said pulse detonation mode.

10. The combustor of claim 4, wherein the dual mode combustors are distributed symmetrically and radially around a centerline of said combustor.

11. An engine, comprising:
a combustion stage; and
a turbine stage downstream of said combustion stage to receive combustion from said combustion stage,
wherein said combustion stage comprises:
at least one dual mode combustor comprising:
at least one fuel-air mixing element coupled to a combustion chamber; and
at least one fuel input device coupled to said fuel-air mixing element,
wherein said at least one fuel input device has a first fuel input portion and a second fuel input portion comprising a high frequency solenoid valve which pulses the fuel flow; and
wherein during a first mode of operation said dual mode combustor is operated in a deflagration mode and fuel is input into said fuel-air mixing element from said first fuel input portion of said fuel input device to support said deflagration mode, and during a second mode of operation said dual mode combustor is operated in a pulse detonation mode and fuel is input into said fuel-air mixing element from said second fuel input portion of said fuel input device to support said pulse detonation mode.

12. The engine of claim 11, wherein said first fuel input portion is a fuel injector.

13. The engine of claim 11, wherein said combustion chamber has either an annulus or circular cross-section.

14. The engine of claim 11, wherein said combustion stage further comprising one of a constant pressure deflagration combustor or a pulse detonation combustor positioned one of along a centerline of the engine or positioned radially external to the engine.

15. The engine of claim 11, wherein said combustor contains a plurality of said dual mode combustors, and wherein during said first mode of operation all of said dual mode combustors are operated in said deflagration mode and during said second mode of operation all of said dual mode combustors are operated in said pulse detonation mode.

16. The engine of claim 11, wherein during a third mode of operation, at least one of said dual mode combustors is operated in said pulse detonation mode, while the remaining dual mode combustors are operated in said deflagration mode.

17. An engine, comprising:
a inlet stage; and
a combustion stage downstream of said inlet stage to receive a flow from said inlet stage,
wherein said combustion stage comprises:
at least one dual mode combustor comprising:
at least one fuel-air mixing element coupled to a combustion chamber; and
at least one fuel input device coupled to said fuel-air mixing element,
wherein said at least one fuel input device has a first fuel input portion and a second fuel input portion comprising a high frequency solenoid valve which pulses the fuel flow; and
wherein during a first mode of operation said dual mode combustor is operated in a deflagration mode and fuel is input into said fuel-air mixing element from said first fuel input portion of said fuel input device to support said deflagration mode, and during a second mode of operation said dual mode combustor is operated in a pulse detonation mode and fuel is input into said fuel-air mixing element from said second fuel input portion of said fuel input device to support said pulse detonation mode.

18. The engine of claim 17, wherein said first fuel input portion is a fuel injector.

19. The engine of claim 17, wherein said combustion chamber has either an annulus or circular cross-section.

20. The engine of claim 17, wherein said combustion stage further comprising an additional one of a constant pressure deflagration combustor or a pulse detonation combustor positioned one of along a centerline of the engine or positioned radially external to the engine.

21. The engine of claim 17, wherein said combustor contains a plurality of said dual mode combustors, and wherein during said first mode of operation all of said dual mode combustors are operated in said deflagration mode and during said second mode of operation all of said dual mode combustors are operated in said pulse detonation mode.

22. The engine of claim 17, wherein during a third mode of operation, at least one of said dual mode combustors is operated in said pulse detonation mode, while the remaining dual mode combustors are operated in said deflagration mode.

* * * * *